Feb. 21, 1967 W. E. BROWNLEE ET AL 3,305,420
METHOD AND APPARATUS FOR APPLYING BONDING PRESSURES OF DIFFERING
MAGNITUDES TO ADJACENT SURFACES OF A WORKPIECE
Filed Dec. 19, 1963 3 Sheets-Sheet 1

INVENTORS
WINSTON E. BROWNLEE
JACK L. RITCHEY
STANLEY STEED
BY
Jerome C. Gross,
ATTORNEY

INVENTOR.
WINSTON E. BROWNLEE
JACK L. RITCHEY
STANLEY STEED

BY

ATTORNEY

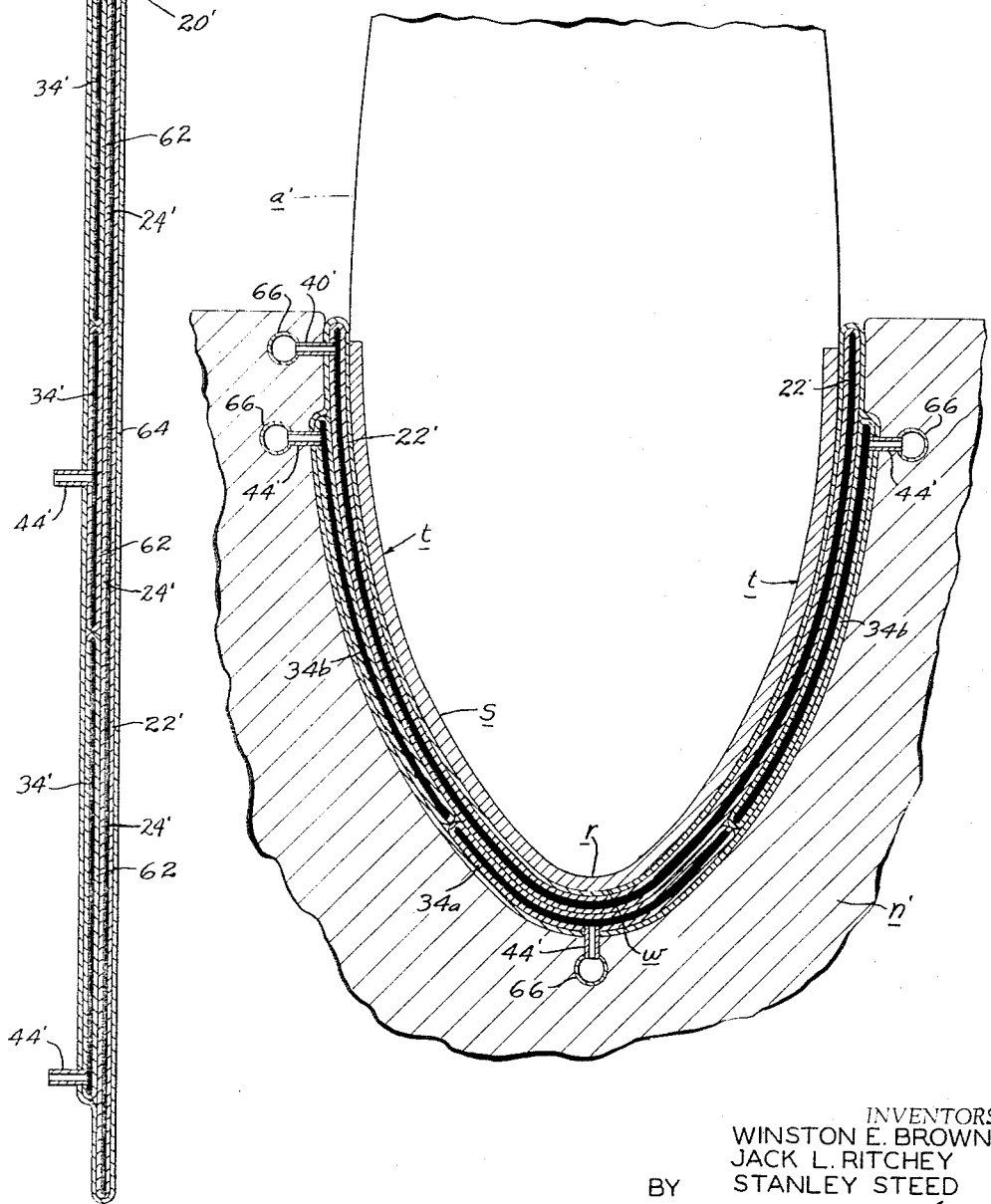

3,305,420
METHOD AND APPARATUS FOR APPLYING BONDING PRESSURES OF DIFFERING MAGNITUDES TO ADJACENT SURFACES OF A WORKPIECE

Winston E. Brownlee, Suttons Bay, and Jack L. Ritchey and Stanley Steed, Traverse City, Mich., assignors to Parsons Corporation, Traverse City, Mich., a corporation of Michigan
Filed Dec. 19, 1963, Ser. No. 331,725
10 Claims. (Cl. 156—217)

This invention relates to inflatable tools for applying pressures for adhesive bonding operations and the like. It has particular application to the problem wherein one or more portions of the workpiece surface to which bonding pressure is to be applied requires the application of greater pressure than other portions thereof.

A typical example of the need for the present invention arises in connection with airfoils such as helicopter rotor blades which have aft surface skins bonded both to light-weight low density filler material and to relatively rigid, sturdy structure, as the spar and trailing edge reinforcement. Such work requires the application of evenly distributed low pressure to that portion of the skin to be bonded to the delicate low density filler material; otherwise the filler material will be indented or even crushed. On the other hand, the bonding of skins to the spar and trailing edge reinforcement requires the application of substantially higher pressure, immediately adjacent to those areas to which the lower pressure is applied and without any void therebetween.

In the prior art, it has been common to apply bonding pressures to such airfoils by placing them in an airtight bag, put into an autoclave, and applying a constant super-atmospheric pressure to the entire airfoil. Another method consists of enclosing the entire airfoil in an airtight bag which is then evacuated so that the atmospheric pressure of the air is applied evenly over the entire airfoil surface. Each procedure has the shortcoming of being incapable of applying a greater pressure to those areas which require it. Accordingly, for the purpose of achieving high strength bonding of the skin to the spar and trailing edge reinforcements, a second operation may be required involving the application of greater positive pressures, as by clamping.

Smaller inflatable members, such as air hoses, have been heretofore utilized to apply pressures to localized areas. The inventors do not know of any attempt to utilize such hoses in such a bonding operation, side by side, with greater pressure in some hoses than others; one inherent and obvious shortcoming of such an attempt would be that the areas of finite width at the junctions of the two adjacent pressure hoses would have no substantial pressure applied to them. That is, to achieve greater pressure upon some areas than others, areas of substantial width between contiguous pressure areas would be left without any substantial pressure whatsoever.

A principal purpose of the present invention is to provide an inflatable tool capable of providing greater pressure in precisely defined areas, without discontinuity of pressure or undesired pressure loss at the boundaries of the high and low pressure areas.

A further purpose is to apply such greater localized pressure within precisely chosen portions of the larger area to be pressurized, whereby the localized high pressure areas are wholly surrounded by areas of lower pressure.

A still further purpose is to provide a novel method of making an inflatable tool which is capable of simultaneously taking up working tolerances and applying differing bonding pressures to precisely defined and adjacent areas of a workpiece.

A problem met by the present invention may be stated as follows: If even the improved flat pressure bags, such as disclosed in the copending application Ser. No. 255,998, filed Feb. 4, 1963, by Winston E. Brownlee and Jack L. Ritchey, would be used to apply pressures of differing magnitudes to adjacent surfaces, a serious problem would arise. Although such flat bags present a pressure-applying side to the work, when inflated, they have arcuate edges. If two such arcuate edges be presented side by side, an area thereunder would be left without any substantial applied pressure.

The present invention overcomes this problem generally, by providing a large flat inflatable bag of fabric material which is dilatable on inflation. This large bag has two flat sides meeting at folded, arcuate bag edges and an internal pattern having one non-adherent surface exposed to the hollow cavity and one surface adhered to the inner surface of one of the flat sides. A plurality of smaller flat pressure bags are adhered to a surface of the larger bag. Pressure suplying hoses provide super-atmospheric pressure to the individual bags. Upon inflation, the larger bag presents a flat side which applies, uninterruptedly, a substantial pressure; whereas the small bags provide other precisely localized increased pressures in a programmed order of pressure application.

Such an inflatable tool may be conveniently made by the method of placing smaller area bags, made preferably in the manner set forth in the said co-pending application, upon the non-adherent surface of the internal pattern of a larger bag, made in substantially the same manner. Layers of uncured vulcanizable ply material which form the larger bag are folded over the smaller bags so positioned. On vulcanization, the smaller bags are adhered to the innermost layer of one side of the larger bag, each smaller bag in its precisely predetermined location.

Other objects and many of the attendant advantages of this invention will be apparent from the remainder of this specification and from the drawings, in which.

Figure 3:
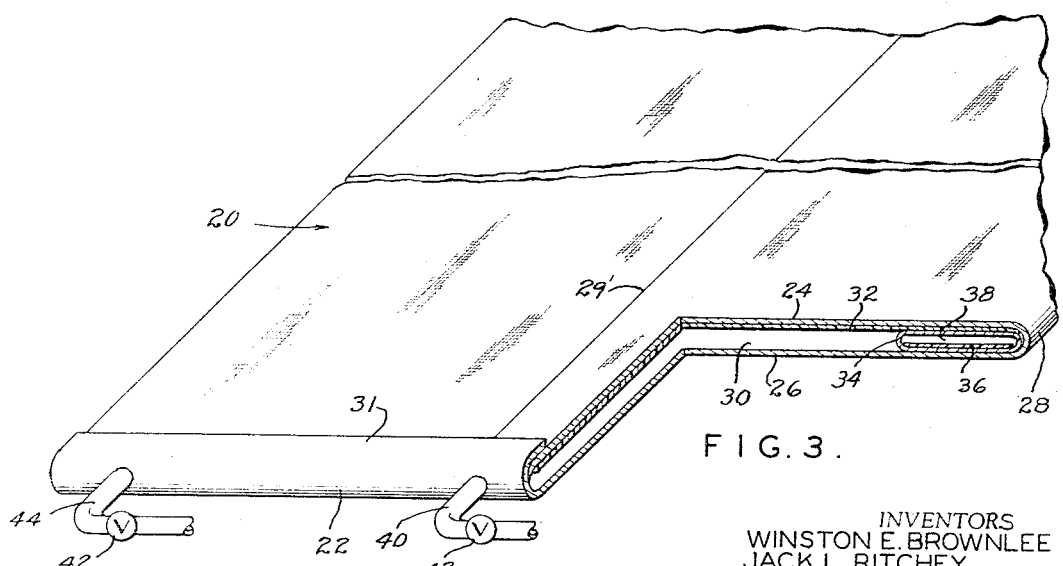
Figure 4A:
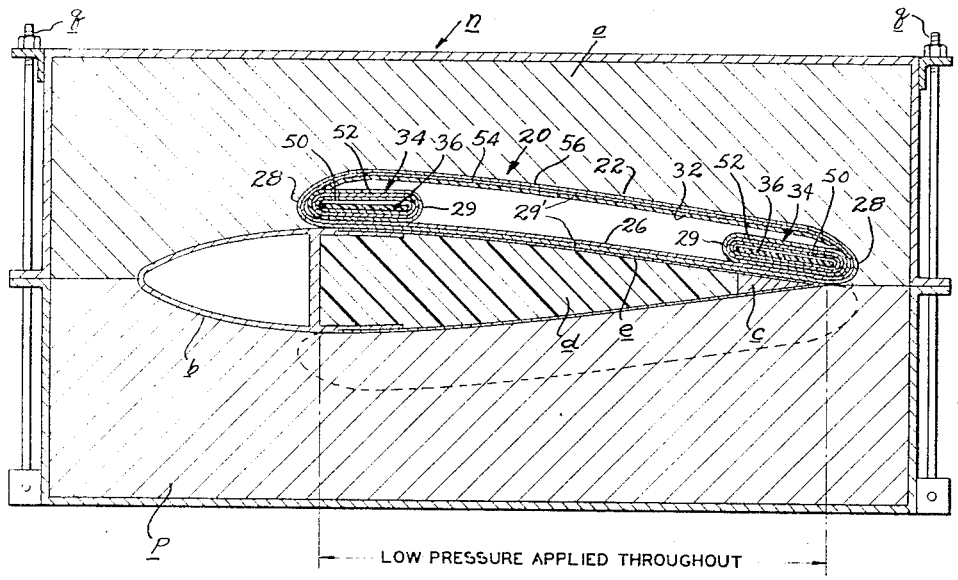
Figure 4B:
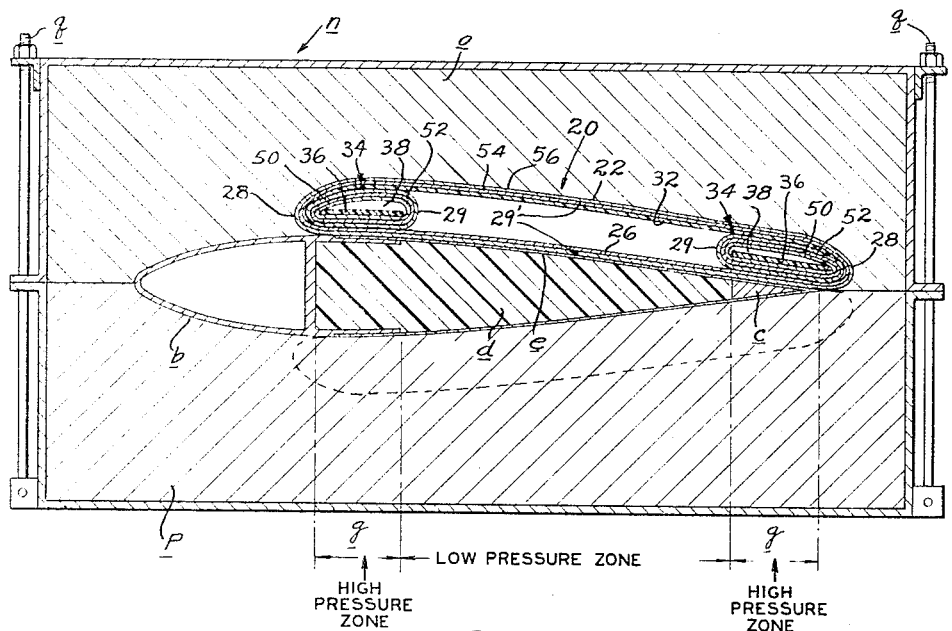

FIGURE 3 is a perspective view, partially broken away, of the present inflatable tool having small higher-pressure bags adhered within a larger, lower-pressure bag whereby differing pressures may be applied to precisely defined areas of a work surface FIGURE 4a is a cross-sectional view of a helicopter blade clamped in a molding fixture having a recessed portion containing the tools of FIGURE 3 showing only the larger bag inflated;

FIGURE 4b is a cross-sectional view similar to FIGURE 4a wherein the higher pressure bags are also inflated;

FIGURE 5 is a cross-sectional view of another embodiment of the inflatable tool, wherein the small pressure bags are adhered to the outer surface of the larger pressure bag; and FIGURE 6 is a sketch of the embodiment of FIGURE 5, shown inserted between a bonding fixture and an airfoil leading edge, shown with all bags inflated, at the close of the progression of inflation steps described.

Figure 1:
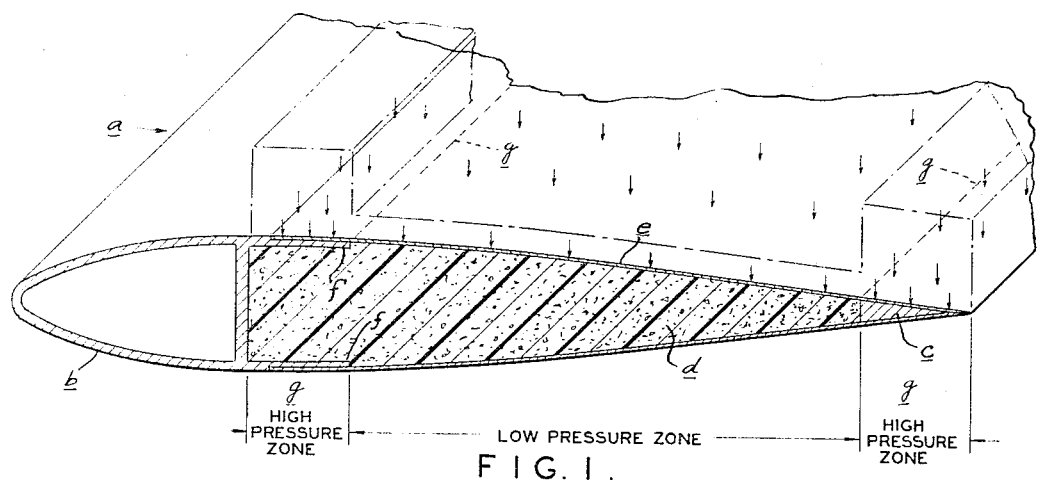
FIGURE 1 is a schematic perspective view of a helicopter blade whose construction requires the application of high and low pressures in adjacent zones.

Referring now to the drawings, wherein like reference characters designate like or corresponding parts throughout the several views, there is shown in FIGURE 1 a helicopter blade $a$ having a metal leading-edge spar $b$, a metal trailing edge insert $c$, and a light-weight low density material $d$ therebetween. An aft surface skin $e$ is adhesively bonded to the airfoil $a$ in a closing operation during which great care must be taken to afford a reliable bond. To insure effective bonding, higher pressures are applied to those areas of the skin *e* to be bonded to the sturdy aft-extending spar portions *f* and trailing edge insert *c*, while lower pressures are applied to the skin area to be bonded to the low density filler material *d*.

If the higher pressure is not precisely confined to the high pressure zones *g* but allowed to extend slightly beyond them, the low density material *d*; e.g. plastic foam, will be crushed or indented. Likewise, if the high pressure applied does not extend over the entire width of the spar portions *f* and trailing edge insert *c*, a weakened bond results. It can be noted, therefore, that the pressure-applying tool used in bonding operations must apply precise delineated areas of pressure to the closing skin *e*, while at the same time being capable of physically conforming to the contour of the airfoil *a* so precisely as to take up variations and working tolerances.

Figure 2:
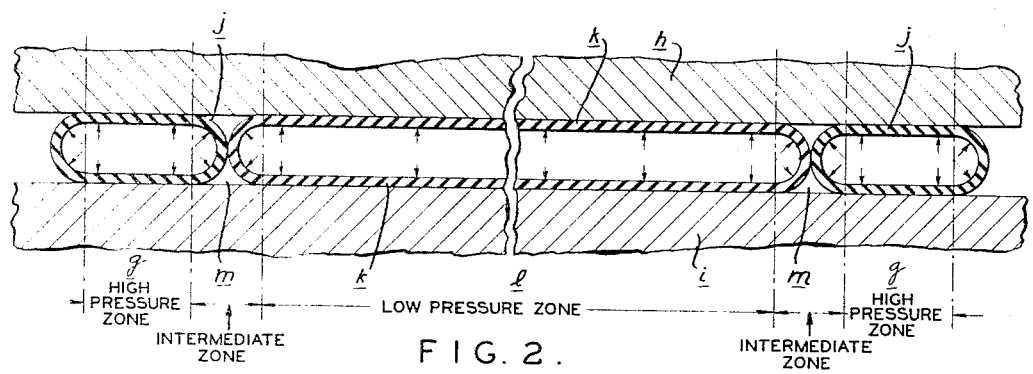
FIGURE 2 is a sketch illustrating the problem of applying differing pressures to a surface by utilizing abutting, side-by-side, pressure bags.

FIGURE 2 shows schematically the problem of applying differing pressures to adjacent areas of a workpiece utilizing externally abutting pressure bags or hoses. High pressure bags *j* and low pressure bags *k* are shown inflated and interposed in abutting relationship between two generally parallel surfaces, which may be a platen *h* and a workpiece *i*. The pressure bags *j* and *k* have essentially two flat sides, one engaging against and confined to flatness by the platen *h* and the other engaging against and applying pressure to the workpiece *i*, these being referred to respectively as the "pressure-resisting" and "pressure-applying" sides. These flat sides of the bags *j* and *k* meet in arcuate edges of finite width which due to inflation of the bags are held out of contact with the surfaces of the platen *h* and workpiece *i*. The detrimental feature of this abutting relationship of the bags *j* and *k* resides in the fact that a finite surface area *m*, directly beneath the arcuate edges of the bags and intermediate the high and low pressure zones, receives substantially no applied pressure. Pressure discontinuities will therefore exist in the intermediate zones *m* between the low pressure zone *l* pressed by the pressure-applying side of the bag *k* and the high pressure zones *g* pressed by the pressure-applying sides of the abutting bags *j*.

To overcome this problem, there is shown in FIGURE 3 a novel inflatable tool 20 utilized in applying bonding pressures to a workpiece surface where precise delineation of differing pressure zones is required. The inflatable tool 20 comprises a flat, dilatable pressure bag 22 having a pressure-resisting side 24 and a pressure-applying side 26 which meet in folded, arcuate bag edges 28 and end lap 31 to delimit a hollow pressure cavity 30. The flat sides 24, 26 and lap 31, and edges 28 are preferably layers of reinforced ply laminates of glass fiber fabric, impregnated and coated with rubber or vulcanized material, as disclosed in said co-pending application, Serial No. 255,998 filed February 4, 1963. The individual laminates have butt joints 29' alternately on opposite sides of the bag whereby each layer reinforces the joints of the adjacent layers. Adhered to the inner surface of the pressure-resisting side 24 is an internal bag pattern 32 of thin, flexible plastic material having the characteristics hereinafter referred to.

The pattern 32 extends to the edges 28 of the large pressure bag 24 and defines the size of the cavity 30. The preferred plastic material, Teflon, is characterized by the fact that when formed smooth it is non-adherent to vulcanizable materials. Adherency of one surface of the bag pattern 32 to the pressure-resisting bag side 24 is obtained by etching this surface of the Teflon pattern 32, which thus adheres when the bag is vulcanized. The other, non-etched surface of the pattern is non-adherent, and on vulcanizing presents itself exposed to the hollow pressure cavity 30 within the bag. The laminates are sufficiently longer than the pattern to be folded back, prior to vulcanization, to provide fold laps 31 which close the bag ends. For clarity, FIGURE 3 shows only the innermost laminate and its end lap 31.

Interposed within the hollow pressure cavity 30 are small pressure bags 34 which are of the same general construction as large pressure bag 22. The small pressure bags 34 have similar internal bag patterns 36 and are of smaller cross-sectional dimensions than large pressure bag 22. They are formed first; on later "laying up" and vulcanizing the larger pressure bag 22, these smaller pressure bags 34 become adhered by vulcanization to the inner surface of the pressure-applying side 26 of large pressure bag 22 to provide the integral dual pressure bag structure. The interface or area of adherency between the pressure bags 22 and 34 defines the high pressure area of bag 22, the remainder of the pressure-applying surface of the bag applying the low pressure of cavity 30.

Communicating with the hollow pressure cavity 30 is a low pressure inlet conduit 40. Introduction of low air pressure supplied by a pump (not shown) is controlled by valve 42 and selectively supplied to the hollow pressure cavity 30. In like manner, hollow pressure cavities 38 of high pressure bags 34 are supplied with air pressure from such a pressure pump through the inlet conduit 44 and valve 42.

In operation, the inflatable tool 20 is housed within an airfoil mold-like fixture *n*, as shown in FIGURE 4. This mold *n* has an upper fixture part *o* and a lower fixture part *p* secured together by fastening means *q*. The upper fixture part *o* and the lower fixture part *p* have internal recessed surfaces contoured to receive and support the helicopter blade structure during the bonding operation. The recessed portion of lower fixture part *p* housing the inflatable tool 20 is shown in dashed construction lines, it being understood that a second similar inflatable tool may be inserted in this section where it is desirous to bond both the upper and lower skins in a single closing operation.

The large pressure bag 22 may be inflated before the small pressure bags 34 which are there shown deflated, see FIGURE 4a. In this condition, the pressure-applying side 26 of the large pressure bag 22 will exert its low pressure throughout the length and width of skin *e*. The low pressure to be applied is chosen such that it is sufficient to insure proper bonding of the closing skin *e* to the low density material *d* without crushing or indentation thereof. However, this pressure is necessarily lower than that required for a safe bond between the skin *e* and the metal spar *b* and trailing edge insert *c*; substantially higher bonding pressures must be applied to those portions of skin *e* in contact with these elements. To provide this type of pressure distribution small pressure bags 34 are inflated, as shown in FIGURE 4b. The higher pressures within their hollow pressure cavities 38 are transferred via the pressure-applying side walls of these bags 34 through the wall of the bag 22 to those precise portions of closing skin *e* positioned directly beneath the adhered interface area between each smaller bag 34 and the larger bag 22. The remainder of the surface of pressure-applying side 26 of the larger bag 22 (including that surface area which lies directly below the inflated, arcuate edges 29 of the bags 34) is subjected to the lower pressure within such larger bag.

Thus, it may be seen that the present invention permits the application of a relatively high pressure to those zones of the skin *e* positioned directly above the aft extending spar portions *f* and the trailing edge insert *c* while at the same time assuring that a lower pressure is applied over the entire remaining portion of the closing skin *e*. By enclosing the smaller high-pressure bags within the large low-pressure bag, the inflatable tool 20 insures that no zone of insubstantial or zero pressure may exist therebetween. In other words, the high and low pressure applying zones are separated only by a finite-point boundary. If the magnitudes of the applied pressures existing across this boundary were plotted, a step-function type graph would be obtained.

The method of making the inflatable tool 20 can best be understood by referring to FIGURES 3 and 4. Initially a determination is made as to the width and length of the high pressure zone g, see FIGURES 1 and 4b, to which the high pressure is to be applied. The internal bag pattern 36 is cut to these dimensions to thereby define the cavity 38 of the completed small pressure bags 34. The internal pattern 36 is the flexible (or flexible-edged) flat material; preferably Teflon, having one etched or roughened adherent surface and one smooth non-adherent surface. A first laminate 50 of uncured vulcanizable ply material is laid out and cut to a width which is twice that of the internal pattern 36. The length of the laminate 50 is chosen such that it exceeds the length of the internal pattern 36 sufficiently to turn back the end to close the bag on vulcanization. The internal pattern 36 is then centered on the first laminate 50 with its adherent surface in contact with the laminate surface. This placement of internal pattern 36 is such that marginal portions of laminate 50 extend beyond the edges of the pattern. These marginal portions are folded along the edges of the pattern 36 and over its upwardly facing non-adherent surface such that the edges of the laminate 50 meet midway of said internal pattern 36 in an abutting joint. End laps 31 of the laminate 50 (similar to the end lap 31 of the larger bag illustrated in FIGURE 3) are folded over. The laminate 50, folded in this manner, becomes the innermost layer of the smaller pressure bag 34.

A second similar layer of the smaller pressure bag 34 may be formed by cutting another laminate 52 which is of sufficient length and width so as to overlap the first laminate 50. The abutting joint of laminate 50 is then placed upon and centered within the laminate 52 so as to permit marginal portions to extend beyond the folded arcuate edges of the innermost layer. By folding these marginal portions over the innermost layer and causing the edges to meet in an abutting joint on the side of the internal pattern 36 opposite that of the joint of the innermost layer, a second layer of pressure bag 34, is formed. The above described cutting, placing and folding process may be continued until the desired number of bag layers are obtained. After the desired number of layers have been formed about the internal pattern 36, the bag ends are folded and trimmed to provide the completely enclosed hollow pressure cavity 38.

The desired number of small pressure bags 34 necessary in any particular application may be produced in the same manner set forth hereinabove. If desired, the smaller pressure bags may be vulcanized at this stage.

Having formed the plurality of small pressure bags 34, a larger internal pattern 32 is cut of flexible material, similar to that of the smaller internal pattern 36. The length and width of this larger pattern 32 is determined by the length and width of the entire area to which both the high and low pressures are to be applied. A laminate 54 of uncured vulcanizable ply material is cut to approximately twice the size of the internal pattern 32. The bag pattern 32 is placed upon and centered within laminate 54 so that its adherent surface is against the laminate 54. The small pressure bags 34 are then centered upon the non-adherent surface of internal pattern 32 at those predetermined positions which will locate them over the high pressure zones of the workpiece in the completed inflatable tool 20. Marginal portions of laminate 54 extend beyond bags 34 and the edges of internal pattern 32 when bags 34 are so positioned. These marginal portions are folded along the edges of the pattern and over its non-adherent surface and the bags 34 to meet in a butt joint. Their end laps 31 are then folded over. These steps produce the innermost layer of the large pressure bag 22.

By cutting another laminate 56 of sufficient length and width to overlap the innermost layer, placing the joint of the innermost layer upon and within the width of laminate 56, and folding the marginal portions and end laps over the innermost layer as described above, a second layer of the pressure bag 22 may be formed. The combined structure of pressure bags 34 and 22 is then vulcanized, resulting in the adherence of the pressure bag 34 to the pressure-applying side 26 of large pressure bag 22. Air inlet conduits 40 and 44 are then inserted into the respective low and high pressure bags 22 and 34 to provide means for inflating these bags to different pressures.

Obviously many modifications and variations of the present invention are visible in the light of the above teachings. For example, the pressure-resisting side 24 and pressure-applying side 26 may be reversed in the fixture if tolerances are carefully controlled. However, the area of adherency between the small bag 34 and large bag 22 aids in defining high pressure zones precisely.

A unique embodiment of the inflatable tool of the present invention, especially suited for applying pressures over area portions in a programmed sequence, is shown in FIGURE 5, where the large bag 22' is shown with three smaller bags 34' positioned along its flat outer surface. The large bag 22' and small bags 34' are of the same general construction as the bags 22 and 34, respectively. However, the outer surface 25 of the pressure-resisting side 24' is here adhered to the pressure-applying sides 62 of the smaller bags 34'. This construction results in the definition of a large pressure area by the larger bag 22' and three smaller pressure areas by the smaller bags 34'. The entire extents of the pressure-applying sides 62 of the bags 34' are adhered to the outer surface 25 of the pressure-resisting side 24'.

To insure that the small bags 34' do not become separated from the large bag 22', either in handling or by repeated inflation and deflation of the bags, an outer cover sheet 64 is placed around the composite structure. If desired, the cover sheet 64, which is a vulcanized, rubberized-glass fiber material like the back laminates, may be wrapped entirely around both the small bags 34' and the large bag 22'. However, as will be apparent, the cover sheet 64 need only be of a size coextensive with the pressure-applying area of the large bag 22'. In this arrangement, the cover sheet 64 is adhered to the pressure-resisting sides of the large bag 22' and the small bags 34'. Air inlets 40' and 44' are inserted through the cover sheet 64 and the pressure-resisting sides of the bags to communicate with the hollow cavities of the bags. This arrangement permits the insertion of more inlets or a better spacing of inlets than can be provided in the end arrangement of FIGURE 3.

The advantages obtained by the dual bag arrangement of FIGURE 5 will now be discussed, with reference to FIGURE 6. The generally concave leading edge bonding fixture n' is used in an assembly operation wherein a metal leading edge abrasion strip s is to be fitted and adhesively bonded to the helicopter rotor blade a', which is inserted in the contoured fixture cavity. The fixture is provided with air pressure supply pipes 66 so that pressure may be applied throughout the length of the bags. In these operations the abrasion strip s, which is preformed to the general outline of the rotor blade leading edge, must be pressed against the blade a' without voids forming therebetween. The central or nose portion w of the strip s has a smaller radius than its adjacent, extending portions t. The inflatable tool 20', inserted between the fixture n' and strip s, applies the fitting and bonding pressures thereto via air pressure supply pipes 66 and the inlets 40' and 44'. Should pressure be applied to the entire surface area of the strip s simultaneously to obtain the desired close fit, there may result some bulging of the nose portion w thereof, resulting in possible voids or locally thicker adhesive material, causing a weakened abrasion strip bond.

The inflatable tool 20' of FIGURE 6 avoids these problems by permitting the pressure to be applied sequentially. First, the small leading edge bag 34a is inflated via air pressure supply pipes 66 and inlets 44'. This forces the radius portion r tightly against the nose of the leading edge of the blade a'. The adjacent or marginal smaller bags 34b are then similarly inflated, forcing the aft-extending strip portions t tightly against the blade a' without at any time releasing the fixed fit of the radius portion r. In this manner of fitting, any tendency of the metal strip s to bulge and create pockets or spaces is avoided. Also, any excess adhesive is forced aft and discharged from the bonding area.

As the final step of the programmed fitting operation, the large bag 22' is inflated. Because this bag is continuous about the entire surface of the strip s, continuous pressure is applied over its entire area during the ensuing bonding operation. Where heat is required during such bonding operation, a thermal blanket may be inserted between the bag 22' and the strip s.

The magnitudes of pressures in the several bags 22', 34a and 34b may be as required for best fitting and holding to contour. Sequencing the inflation of the several bags in the order noted may result in perfect fitting even though the pressures ultimately supplied to each bag are equal, as in the inflated view in FIGURE 6.

In addition to these disclosed embodiments and variations thereof, it is to be understood, that within the scope of the appended claims, the invention may be practiced otherwise than as specifically described.

In the claims, the term "dilatable" as used refers to that characteristic of the bags which permits inflation thereof, without any substantial extension in their overall length or width.

We claim:

1. For use in applying pressure to surfaces for adhesive bonding and the like,
  a tool inflatable to a plurality of differing pressures, comprising
  a first inflatable pressure bag characterized in being dilatable on inflation and deflatable to flatness, said first bag having a pressure-applying side and a pressure-resisting side meeting at folded bag edges, together with
  a second similarly characterized inflatable pressure bag of smaller dimensions adherently joined to the inner surface of one of said sides, and
  means communicating with the cavities of said first and second bags for applying selected pressures to said first and second bags.

2. For use in applying pressure to surfaces of adhesive bonding and the like,
  a tool inflatable to a plurality of differing pressures, comprising
  a first inflatable bag of fabric material comprising first and second flat sides meeting at folded bag edges to delimit hollow cavity,
  a flexible flat pattern of a size corresponding to the inner surfaces of the bag when flattened, said pattern having one non-adherent surface exposed to the hollow cavity and one surface adhered to the inner surface of said first flat bag side,
  a flat inflatable bag of smaller cross-sectional dimension than said first bag interposed in the hollow cavity of said first bag, said smaller bag being adhered to said inner surface of said second flat side at a predetermined position, and
  fluid inlet means communicating with the cavities of said first bag and said smaller bag for supplying differing super-atmospheric pressures thereto.

3. For use in applying pressure to surfaces for adhesive bonding and the like,
  a tool inflatable to a plurality of differing pressures, comprising
  a first inflatable bag of fabric material comprising first and second flat sides meeting at folded bag edges to delimit a hollow pressure cavity therein,
  a plurality of flat inflatable bags of smaller cross-sectional dimensions than said first bag having flat sides meeting at folded bag edges interposed in the hollow cavity of said first bag, and
  a flat side of each of said plurality of bags being adhered between its folded edges to the inner surface of said first flat bag, the areas of adherency defining a higher pressure area thereon, the remainder of the inner surface of said second flat side defining a lower pressure area, and
  fluid inlet means communicating with the cavities of said first bag and said plurality of bags whereby super-atmospheric pressures of differing magnitudes may be supplied to said first bag and said plurality of bags.

4. For use in applying pressure to surfaces for adhesive bonding and the like,
  a tool inflatable to a plurality of differing pressures, comprising
  a first inflatable pressure bag having first and second flat sides delimiting a hollow pressure cavity and meeting at arcuate bag edges, said first and second sides being layers of reinforced ply laminates joined alternately at opposite sides of the bag, said first bag further having within the innermost layer and there adhered to the inner surface of its second flat side, a flexible flat pattern of a size corresponding to the inner size of the bag when flattened, said pattern having one non-adherent surface,
  a plurality of similarly constructed inflatable pressure bags of smaller cross-sectional dimensions than said first bag interposed in said pressure cavity and adherently joined at predetermined positions to the inner surface of said first flat side of said first bag, and
  inlet means communicating with the cavities of said first bag and said plurality of bags for supplying differing super-atmospheric pressure thereto.

5. The method of producing an inflatable tool for applying a plurality of differing pressures to surfaces for adhesive bonding and the like, comprising the steps of
  cutting an internal pattern of flexible-edged flat material having one non-adherent surface,
  cutting a first laminate of uncured vulcanizable ply material of substantially twice the width of said internal pattern,
  placing said internal pattern upon and within the width of said first laminate with said adherent surface against said first laminate so as to leave first marginal portions along both edges of the pattern,
  placing a first flat pressure bag upon said non-adherent surface of said internal pattern at a predetermined location,
  folding said first marginal portions of said first laminate along the edges of said first pattern and over said non-adherent surface and said first flat pressure bag and joining the edges of said first laminate,
  cutting a second similar laminate sufficiently larger than said first laminate so as to overlap it,
  placing the joint of said first laminate within the width of said second laminate so as to leave second marginal portions on both sides of said innermost layer,
  folding said second marginal portions over said innermost layer and joining the edges of said second marginal portions,
  closing both ends of the layers so formed to provide a second pressure bag,
  inserting air inlets at the ends of said first and second pressure bags and extending through the respective innermost layers, and
  vulcanizing the combination so formed to adherently bond said first pressure bag to the innermost layer of said second pressure bag.

6. The method of producing an inflatable tool for applying a plurality of differing pressures to surfaces for adhesive bonding and the like, comprising the steps of cutting a first internal pattern of flexible-edged flat material having one adherent and one non-adherent surface, cutting a first laminate of uncured vulcanizable ply material to twice the width of said first pattern, placing said first pattern upon said first laminate with said adherent surface thereagainst so as to leave first marginal portions along both edges of the pattern, folding said first marginal portions of said first laminate along the edges of said first pattern and over its non-adherent surface whereby the edges of said first laminate meet thereupon in a joint, thereby providing the innermost layer of a first pressure bag, cutting a second similar laminate sufficiently larger than said first laminate to overlap it, placing the joint of said first laminate upon said second laminate so as to leave second marginal portions on both edges of said innermost layer.

folding said second marginal portions over said innermost layer and causing the edges of said second marginal portions to meet in a joint on the side opposite the joint of the innermost layer, thereby providing a second layer of said first pressure bag, closing both ends of the layers of said first bag to provide a completed first pressure bag, and cutting a second internal pattern of a flexible-edged flat material having one adherent surface and one non-adherent surface, said second pattern being substantially larger than said first pattern, cutting a third laminate of uncured vulcanizable ply material to substantially twice the size of said second pattern, placing said second pattern upon and within the width of said third laminate so as to leave third marginal portions along both edges of said second pattern, placing said first bag on said non-adherent surface of said second pattern, folding said third marginal portions of said third laminate along the edges of said second pattern and over both its non-adherent surface and said bag, and joining the edges of said third laminate, cutting a fourth similar laminate sufficient to overlap said third laminate, placing the joint of said third laminate upon and within the width of said fourth laminate so as to leave fourth marginal portions on both sides of the innermost layer of a second pressure bag, folding said fourth marginal portions over said innermost layer of said second pressure bag and causing the edges of said fourth marginal portions to meet in a joint on the opposite side of the innermost layer joint to provide a second layer of said second pressure bag, closing both ends of the layers to provide a completed second pressure bag, inserting air inlets at the ends of the first and second bags, and extending through their respective innermost layers, and vulcanizing the first and second bags.

7. For use in applying pressure to surfaces for adhesive bonding, and the like, an inflatable tool, comprising a first inflatable pressure bag which dilates on inflation and deflates to flatness, said first bag having a pressure-applying side and a pressure-resisting side, each said side having inner and outer surfaces with said inner surfaces thereof meeting at bag edges to delimit a first pressure area, a similarly constructed inflatable pressure bag having pressure-applying and pressure-resisting sides, each said side having outer and inner surfaces, the inner surfaces thereof meeting at edges to delimit a second pressure area smaller than said first pressure area, the said pressure-applying side of said smaller bag being adhered over the entire extent of its said second pressure area to a surface of the larger bag other than the outer surface of its pressure-applying side, and separate fluid inlet means communicating with the interior of each of said bags for supplying superatmospheric pressures to each whereby the pressure resulting from inflation of said smaller bag is transmitted over said entire second pressure area through its pressure-applying side and through the pressure-applying side of said larger bag.

8. The inflatable tool of claim 7, wherein said fluid inlet means communicate with the interiors of said bags through the respective pressure-resisting sides thereof.

9. The inflatable tool of claim 8, wherein the surface of the larger bag to which said smaller bag is adhered is the outer surface of its pressure-resisting side.

10. The inflatable tool of claim 9, wherein a covering sheet at least coextensive with said first pressure-applying area is adhered to the pressure-resisting side of said first bag, said sheet covering therewith the pressure-resisting side of said small bag.

References Cited by the Examiner

UNITED STATES PATENTS 3,038,825    6/1962    Little _____ 156—580

MORRIS SUSSMAN, Primary Examiner.

W. J. VANBALEN, Assistant Examiner.